United States Patent [19]
Ashbaugh

[11] Patent Number: 5,337,511
[45] Date of Patent: Aug. 16, 1994

[54] CARRIER FOR FISHING LURES

[76] Inventor: Millard G. Ashbaugh, 415 Walnut, St. Clair, Mo. 63077

[21] Appl. No.: 196,505

[22] Filed: Feb. 15, 1994

[51] Int. Cl.$^5$ ............................................. A01K 97/06
[52] U.S. Cl. ................................. 43/57.1; 224/226; 224/253; 224/920; 206/315.11; 43/57.3
[58] Field of Search ............................ 206/6.1, 315.11; 224/103, 226, 252, 253, 269, 268, 920; 43/57.1, 57.2, 57.3, 54.1, 25.2, 25

[56] References Cited

U.S. PATENT DOCUMENTS

| | | |
|---|---|---|
| 1,486,470 | 3/1924 | Welch . |
| 1,634,030 | 6/1927 | Korkames . |
| 1,797,098 | 3/1931 | Minehart ............................ 224/268 |
| 2,370,013 | 2/1945 | Crowell . |
| 2,543,313 | 2/1951 | Dietzgen ............................ 224/252 |
| 2,548,080 | 4/1951 | Thorn ................................. 43/54.1 |
| 2,595,230 | 5/1952 | Daviau ............................... 206/315.11 |
| 2,675,640 | 4/1954 | Adamek . |
| 2,729,913 | 1/1956 | Holwerda . |
| 2,782,553 | 2/1957 | Harris . |
| 3,292,298 | 12/1966 | Mullikin . |
| 3,524,571 | 8/1970 | Young et al. . |
| 4,681,220 | 7/1987 | Beneke . |
| 4,827,659 | 5/1989 | Gulley et al. . |
| 5,004,136 | 4/1991 | Leath ................................. 224/268 |
| 5,182,878 | 2/1993 | Clark ................................. 43/57.1 |

FOREIGN PATENT DOCUMENTS

| | | |
|---|---|---|
| 451165 | 9/1948 | Canada . |
| 1269074 | 5/1990 | Canada ............................... 206/6.1 |
| 0453359 | 12/1927 | Fed. Rep. of Germany ...... 224/252 |
| 1565351 | 5/1969 | France . |
| 70177 | 3/1946 | Norway . |

*Primary Examiner*—P. Austin Bradley
*Assistant Examiner*—James Miner
*Attorney, Agent, or Firm*—Richard C. Litman

[57] ABSTRACT

A carrier for fishing lures includes a cylindrical tube having a plurality of holes along the side wall. A hook of a fishing lure may be inserted into any of the holes and positively retained when the carrier is in its normal substantially vertical position due to gravity. The shank of the lure hook will likewise depend downward to lie substantially parallel to the major axis of the cylindrical tube, and cannot be removed from the hole due to the abutting of the hook shank against the side of the tube. However, when the tube is swung to a horizontal position and twisted so the lure hook retaining holes face vertically upward, the hook shank will fall to a vertical position due to gravity to be perpendicular to the major axis of the tube. Due to the relatively small diameter of the tube, the hook may then be lifted from the retaining hole in the tube for use, or a lure may be installed for storage in the tube. The tube is suspended from a belt attachment loop, which loop is easily removable and installable on a belt. The present lure carrier is well suited for use in casual fishing outings of relatively short duration, where the carriage of extensive quantities of tackle and equipment are not desired.

5 Claims, 2 Drawing Sheets

CARRIER FOR FISHING LURES

FIELD OF THE INVENTION

The present invention relates generally to holders and carriers for various articles, and more specifically to a tubular, belt supported carrier for fishing lures of various types as used in sport fishing.

BACKGROUND OF THE INVENTION

Sport fishing is an increasingly popular activity with many persons, as they acquire more leisure time. While many anglers enjoy making a weekend or a longer vacation of a fishing trip, and accordingly will carry relatively large tackle boxes and other equipment, many others seek nothing more than an hour or two of fishing at a nearby pond or stream, particularly when their time is limited. If one wishes to do some fishing on a summer evening after work, for example, one's time is limited to the amount of remaining daylight. Most fishermen are not inclined to carry large amounts of equipment with them for an hour or two of fishing. Even if such were the case, a fisherman would hardly have the time to experiment with innumerable lures, rods, etc., in only an hour or so, to determine the best combination for the conditions.

Accordingly, many persons will carry no more than a few favorite flies, spinners, or other lures judged likely to be effective according to the anticipated conditions, and strike out for their nearby fishing spot with rod and reel in hand. The caricature of the fly fisherman with numerous fishing flies imbedded in a favorite old hat is well known, and demonstrates one means of carrying such fishing lures, However, such a method certainly has its drawbacks, i.e., damage to the hat from the barbs of the hooks when they are withdrawn, possible damage to the hook if too much stress is placed upon the lure during removal from the hat, the time required for careful removal, etc. Yet, little has been done to provide an angler who wishes to travel light, with a safe, convenient, lightweight device for the carriage of various types of fishing lures.

The need arises for a belt supported device providing for the carriage of plural fishing lures of various types. The device must provide for the safe carriage of the lures, enclosing at least the barbed portions and tips of the hooks in order to preclude inadvertent injury to a person handling the lures. The device must at the same time provide for the quick removal of lures therefrom and insertion of lures therein, in order for the angler to maximize the time available for fishing and to rapidly take advantage of any perceived changes in condition which might require a different lure. The device must further be relatively durable and resistant to corrosion, as well as being inexpensive for the casual angler to purchase and use.

DESCRIPTION OF THE PRIOR ART

U.S. Pat. No. 1,486,470 issued to Roy W. Welch on Mar. 11, 1924 discloses a Fisherman's Belt having a number of pockets thereon and including a plurality of eyelets or grommets for the insertion of hooks therein. The device is relatively complex and provides for the carriage of various different types of articles other than hooked lures. When a lure is removed from the belt, a pocket must first be opened, with care taken to prevent possible loss of any other articles which may be contained therein, and the pocket again closed. The present invention is not a belt, but rather a device which may be quickly and easily secured to a belt for use.

U.S. Pat. No. 1,634,030 issued to Joe Korkames on Jun. 28, 1927 discloses a Fishing Line including a holder for plural hooks extending from a single line, as in a trotline. The shanks of the hooks extend from a slot in the side of the generally cylindrical holder or keeper, but due to an internal retainer, the hooks cannot be maneuvered for withdrawal directly from the slotted side of the cylinder. Rather, the cad of the cylinder must be removed and the topmost hook first withdrawn, with subsequent hooks following in order. Even if the Korkames cylinder were suspended from a belt, it would be unsuitable for use in the environment of the present invention, where plural independent hook retainers are provided to allow any selected lure to be removed from the device independently of all other lures. With the Korkames device, all hooks are retained in a common slot, and if e.g., the bottom hook were to be removed, all other hooks above must first be removed.

U.S. Pat. No. 2,370,013 issued to Harry B. Crowell on Feb. 20, 1945 discloses a Fishing Apparatus including a central member having a series of holes therein providing for the insertion of hooks. The central member is fixed to the remainder of the apparatus in one embodiment, and thus cannot be maneuvered to provide for insertion or removal of hooks therefrom. In another embodiment, the entire hook retaining member is removed from the balance of the apparatus as desired. In the present invention, the lure carrier is readily maneuverable to provide for ease of use, but is normally (although removably) affixed to a belt.

U.S. Pat. No. 2,675,640 issued to Frank H. Adamek on Apr. 20, 1954 discloses a Fishhook Carrier comprising a series of cork or felt discs installed along a rod. Hooks are stuck into the discs for storage. The series of discs and the rod are stored within a cylindrical tube. Thus, the tube must be opened to provide access to the hooks, unlike the present invention in which the hooks are installed through holes on the outside of the tube.

U.S. Pat. No. 2,729,913 issued to John J. Holwerda on Jan. 10, 1956 discloses a Container For Fishing Flies comprising a card formed of cork or the like into which the points of the hooks may be stuck. The card is stored within a capped tube. Access is as with the Adamek device discussed above, in that the cap of the tube must be removed and the hook storage card withdrawn from the tube in order to access any of the hooks and lures, unlike the present invention in which the lures are stored externally.

U.S. Pat. No. 2,782,553 issued to Stanley S. Harris on Feb. 26, 1957 discloses a Fishing Tackle Belt comprising a plate with a series of vertical slots therein. The shanks of the hooks are each singly installed within a respective slot, and a retaining clip is installed over the slot to preclude inadvertent removal of the shank from the slot. The multitude of clips required for retention of plural hooks and lures could result in the loss of one or more of the clips, which would increase the likelihood of loss of a corresponding hook or lure stored in a slot for which that retainer was missing. Due to the unique orientation required for removal of hooks from the present lure carrier, no additional clips or retainers are required, yet the hooks are securely retained within the carrier until removal is desired and the carrier is specifically maneuvered to allow for such removal.

U.S. Pat. No. 3,292,298 issued to Arthur J. Mullikin on Dec. 20, 1966 discloses a Fishhook Guard And Leader Aligning Device. The device comprises a relatively small diameter tube which is slipped onto the leader of a trotline. A hook may be inserted into the end of the tube in order to protect a fisherman handling the line. In one embodiment, slots are provided in the side of the tube for the insertion of the hook point. In any case, the tube is retained along the line, rather than being suspended from a belt, and if the tube slips along the line, the hook may easily become displaced from the tube. No special orientation of the tube is required for the insertion or removal of the hook therefrom, and in fact such orientation is impossible, as the tube is always retained axially or coaxially along the line itself.

U.S. Pa. No. 3,524,571 issued to Harvey C. Young et al. on Aug. 18, 1970 discloses a Compact Belt Supported Tackle And Bait Kit. The device is cylindrical and is secured to the belt with its axis parallel to the length of the belt, unlike the present invention. Moreover, plural internal storage compartments are provided for the storage of other articles besides hooks and lures, unlike the present invention. The Young et al. container must be opened for access to any articles stored therein; no external storage is provided, as in the present lure carrier.

U.S. Pat. No. 4,681,220 issued to Robert G. Beneke on Jul. 21, 1987 discloses a Container For An Offshore Fishing Lure. The lure is completely contained within the cylindrical container, with only the leader extending from a slotted passage in one end cap. No means for securing the device to a belt is disclosed, unlike the present invention, nor is any means disclosed to specifically retain fishing lures externally thereon until their use is desired.

U.S. Pat. No. 4,827,659 issued to Travis Gulley et al. on May 9, 1989 discloses a Trotline Device including slotted tubes into which plural hooks may be inserted from one end of the tube. The hooks may only be removed in serial order, in the reverse order of their insertion into the slot of the tube. The narrowness of the slot precludes removal of the hooks directly from the side of the tube, due to the width of the barbs of the hooks. The device is particularly suited to trotline fishing and is more closely related to the Korkames device discussed above, than to the present invention.

Canadian Patent No. 451,165 issued to Nellie S. Shelton on Sep. 14, 1948 discloses a Fishing Hook Holder comprising a slotted tube including means for attachment to a fishing pole. The slot in the tube provides for the insertion of a single hook therein, with the leader of the hook remaining attached to the fishing line extending from the Dole. The device thus serves not so much as a storage unit for the hook or lure, but rather as a guard to preclude the snagging of the hook on other articles. Only a single hook may be contained therein; if more than one hook were inserted therein, they could only be removed serially, as in the Korkames and Gulley et al. devices discussed above.

French Patent No. 1,565,351 to Odette Lisol and published on May 2, 1969 discloses a tubular hook and leader container including means for attachment to a fishing Dole. The device provides for the internal storage of plural hooks and leaders axially within the tube, with the leader eyes being secured at one end and the hooks at the opposite end of the tube. No external passages are provided for the insertion of hooks therein for the external storage of the attached lures, as in the present invention.

Finally, Norwegian Patent No. 70,177 to Hillard Egge and published on Mar. 18, 1946 discloses a generally rectangular hook keeper with plural slots on opposite sides, each slot providing for the insertion of a single hook therein. The hook keeper is attached to the flat surface of a semicylindrical article, rather than being capable of suspended attachment to a belt, as in the present invention. The square hook receptacle passages do not appear to limit the insertion and removal of hooks therefrom to any particular orientation, as in the present invention.

None of the above noted patents, taken either singly or in combination, are seen to disclose the specific arrangement of concepts disclosed by the present invention.

SUMMARY OF THE INVENTION

By the present invention, an improved carrier for fishing lures is disclosed.

Accordingly, one of the objects of the present invention is to provide an improved carrier for fishing lures which provides for the storage and random access of plural hooked fishing lures of various types.

Another of the objects of the present invention is to provide an improved carrier for fishing lures which provides for the external storage and carriage of such lures, with only the ends of the hooks of the lures being captured and guarded for safety.

Yet another of the objects of the present invention is to provide an improved carrier for fishing lures which provides positive retention of lures carried thereon due to gravity, but also provides for ease of removal of a lure without disassembly of any portion of the carrier, by proper manipulation thereof.

Still another of the objects of the present invention is to provide an improved carrier for fishing lures which may be suspended from the belt, belt loop, or the like, of a user thereof.

A further object of the present invention is to provide an improved carrier for fishing lures which may be formed of a variety of materials, including plastic or metal for the tube portion, and fabric, leather or plastic for the attachment strap portion.

A final object of the present invention is to provide an improved carrier for fishing lures for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the figures of the attached drawings.

DETAILED DESCRIPTION OF THE PREFERRED EMBODIMENT

Figure 1:
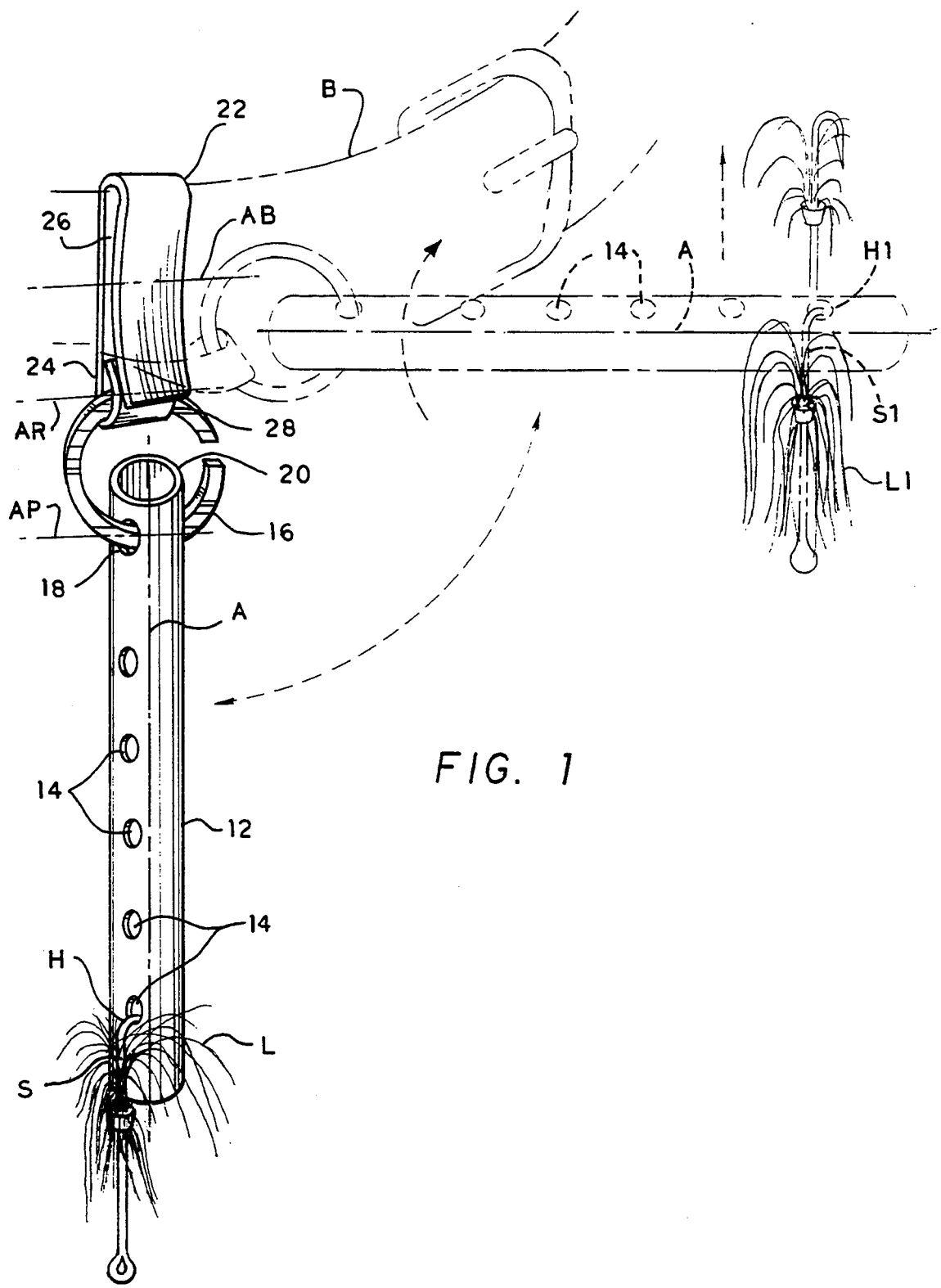
FIG. 1 is perspective view of the carrier for fishing lures of the present invention, showing its normal belt attached position and its position as manipulated by a user thereof for the securing or removal of a fishing lure therefrom.
Figure 3:
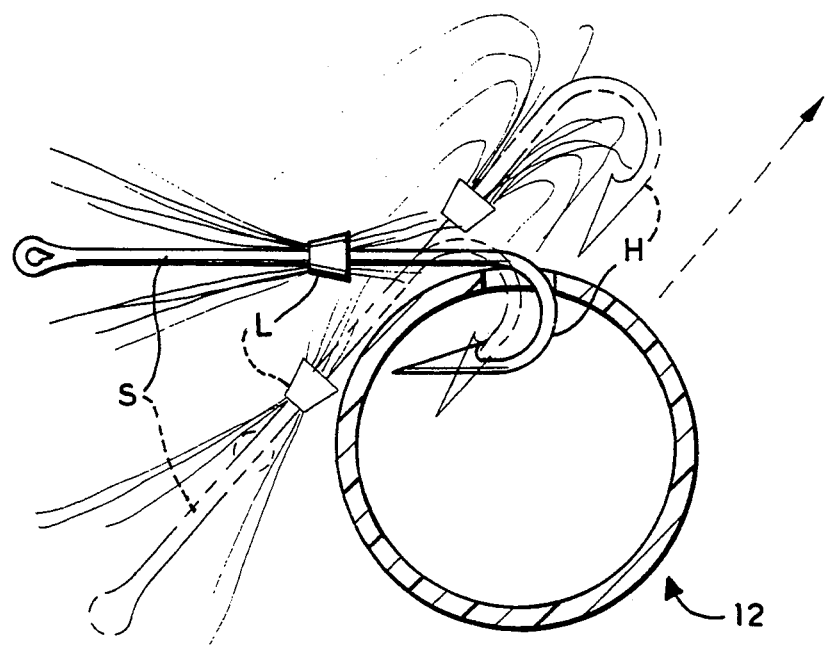
FIG. 3 is a diametrical cross sectional view through the cylindrical carrier tube, showing the rotation and manipulation of the tube to allow the lure hook to be removed or inserted.

Referring now to particularly to FIG. 1 of the drawings, the present invention will be seen to relate to a carrier 10 for the carriage of fishing lures and the like. Fishing lure carrier 10 generally comprises an elongate cylindrical tube 12 having a row of longitudinally spaced apart hook retaining holes 14 aligned along at least one side thereof. The tube 12 is suspended by a generally flat, planar ring 16 which passes through two diametrically opposite passages 18 at the upper end 20 thereof; at least one of the passages 18 is also in alignment with the row of hook retaining holes 14. The ring 16 is in turn supported by a relatively flat, flexible strap 22, which includes a relatively small lower loop 24 sewn or otherwise permanently formed into the bottom portion thereof, in which the ring 16 is secured. A second, openable and larger upper belt loop 26 is provided so the strap 22 may be opened and passed around the belt B of a user of the present lure carrier 10, for carriage thereof. It will be seen that the belt loop portion 26 and lower ring retaining loop portion 24 of the strap 22 may respectively define axes AB and AR therethrough, which axes AB and AR are normally substantially coplanar when the strap 22 is in an untwisted state. In a like manner, the ring passages 16 define a third axis AP, which axis AP is substantially parallel to the above loop axes AB and AR due to the planar form of the ring 16. The belt loop 26 is closable by means of some conveniently openable and reclosable fastening, e.g., hook and loop fastening material 28.

Figure 2:
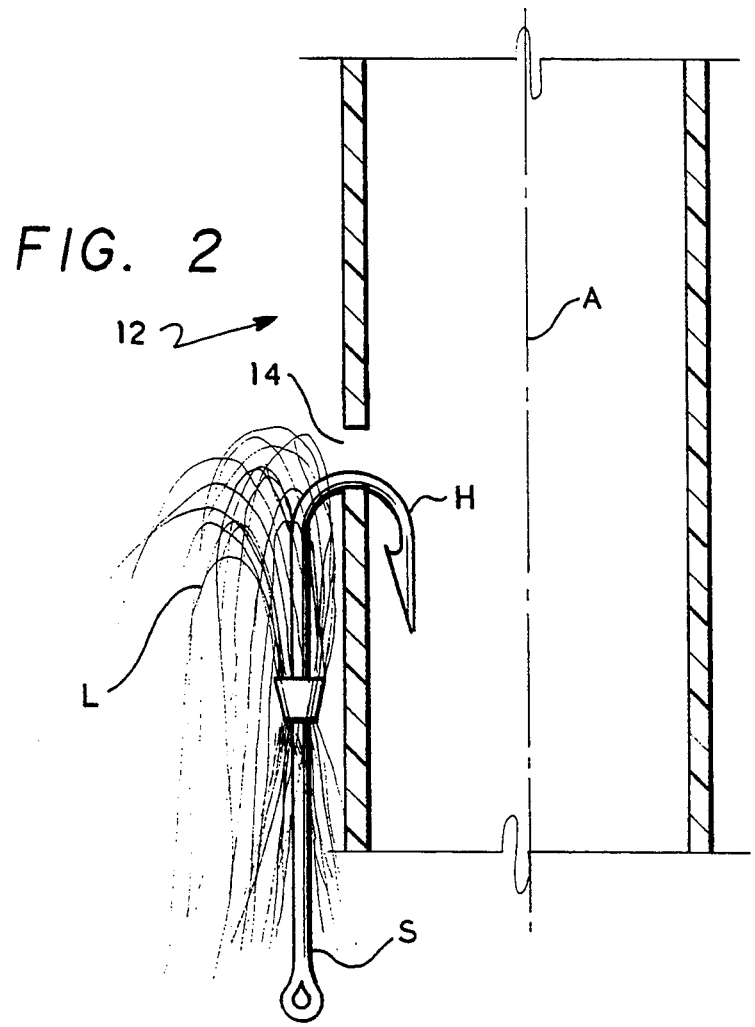
FIG. 2 is an axial cross sectional view through a portion of the carrier tube, with a lure hook secured thereto.

Normally, the lure carrier 10 will be disposed as shown in solid lines in FIG. 1, with the tube portion 12 hanging downward in a substantially vertical position due to gravity and the lack of resistance to motion in any arcuate direction by the strap 22. It will also be noted that the weight of the lure L will also cause the shank S of the hook H to hang substantially vertically, to lie along the side of the cylindrical tube 12 as shown in FIGS. 1 and 2. It will be seen in the cross section of FIG. 2 that the bill or arcuate forwardmost portion of the hook H must be rotated outward in order to be removed from the hole 14; it cannot be lifted straight out, due to the relatively small size of the hole 14 and the bend in the hook H. However, it will also be noted that the shank S of the hook H is prevented from rotating toward the tube 12 when the shank S is parallel to the major axis A of the tube 12, by the side wall of the tube 12. Thus, the hook H of the lure L cannot be removed from the carrier 10 so long as the hook shank S is positioned along the side wall of the tube 12, as in the normal, lure securing substantially vertical orientation of the tube 12 shown in solid lines in FIG. 1.

Returning to FIG. 1 it will be seen that if the shank S1 of the hook H1 is turned 90 degrees to its alignment parallel to the major axis A of the tube 12, as shown with lure L1 to the upper right of the figure, the rounded side wall of the tube 12 will allow the shank S1 to pivot further downward toward the rounded side wall. When this is done, it will be seen that the hook H1 is also rotated outward from the hole 14, and the lure L1 may then be withdrawn from the carrier 10.

While the above maneuver may be accomplished independently of the orientation of the tube 12, it will be seen that it is much more convenient to orient the tube 12 so as to allow the weight of the lure L to maintain the shank S in a substantially vertical position. This is shown in the upper right portion of FIG. 1, as the tube 12 is lifted to orient its major axis A 90 degrees from its substantially vertical at rest position, to a substantially horizontal position. As the axes of the lure retaining holes 14 are substantially parallel to the ring retaining loop 24 of the strap 22, it will be seen that they will remain in a substantially horizontal orientation as the tube 12 and ring 16 are rotated upward about an axis defined by the ring retaining loop 24.

At this point, a lure L still cannot be lifted directly from a retaining hole 14, due to the horizontal orientation of the axes of those holes 14. However, due to the flexible nature of the strap 22, the tube 12 may be twisted about its major axis A in order to cause the holes 14 to face more or less directly upward. When this is done, the shank S1 of the lure L1 will maintain their substantially vertical orientation due to gravity; in effect, the hole(s) 14 will rotate about the curved portion of the hook H1 toward the tip of the hook H1. At this point, the hook H1 (and lure L1) may be lifted directly from the retaining hole 14 for use. The above orientation will be seen to allow the installation of a hook(s) H within a hole 14 also with the tube 12 being allowed to drop to a vertical orientation after the installation or removal of a lure L therefrom.

Preferably, the diameter of the lure hook retaining holes 14 is relatively small; one eighth (0.125) inch has been found to be satisfactory. (It will be understood that the diameter of the holes 14 shown in the drawing figures have been exaggerated for clarity.) One eighth inch diameter hook retaining holes 14 have been found to retain securely fishing hooks up to 4/0 size. Preferably, the tube 12 is formed of a relatively soft corrosion resistant material, such as a PVC or other plastic, in order to provide long life and to preclude dulling of the tips of the lure hooks against the interior of a hard metal tube. However, the tube 12 may alternatively be formed of metals such as aluminum or even stainless steel, if desired. Due to the flexibility required for the twisting of the strap 22 to allow the upward facing orientation of the holes 14 as discussed above, preferably the strap 22 is formed of a durable fabric material (Nylon/tm has been found to be quite suitable). However, other flexible materials (leather, plastic, etc.) may be used alternatively if desired.

Accordingly, the present invention will be seen to provide a handy, light weight carrier for a plurality of fishing lures of various types. (While a fishing fly is shown in the accompanying drawings, the present invention is equally adaptable to virtually any hooked lures, such as spinners, plugs, simulated live bait, etc.) The belt attachment strap 22 provides for attachment to any point along a person's belt B, and thus the present invention is of equal use to both left and right handed persons. The Velcro (tm) or other openable fastener provides for ease of installation of the present lure carrier about a person's belt, without requiring removal of the belt. By lifting the tube 12 of the carrier to a substantially horizontal position and twisting it about the major axis A to position the hook retaining holes 14 along the upper surface of the tube 12, the hook of a lure L may be easily removed from the carrier by lifting the lure directly upwards from its depending position from the hole 14; the hook automatically rotates to a removable position as the carrier tube 12 is maneuvered as described above. Alternatively, the above described position of the carrier tube 12 allows other lures to be returned to the carrier for secure retention, by dropping the hook into an unused hole 14 and dropping the tube 12 to a vertical orientation. The capture of the tip(s) of the hook(s) within the interior of the tube precludes their snagging on some external article and possibly injuring the user of the present invention, while at the same time allowing each lure stored on the present invention to be fully visible with the exception of the hook portion. The present invention will be seen to provide an extremely handy means of safely carrying a few lures, while allowing their ready selection as desired due to their full visibility. Any lure retained on the present carrier is readily accessible without requiring the removal of any other lure for access.

It is to be understood that the present invention is not limited to the sole embodiment described above, but encompasses any and all embodiments within the scope of the following claims.

I claim:

1. A carrier for fishing lures, said lures each having a hook with a hook shank and a hook tip, said carrier comprising:
    a cylindrical tube having a major axis and an upper end and including at least one row of hook retaining holes aligned respectively along at least one side wall thereof, and two diametrically opposite ring passages adjacent said upper end of said tube and defining a ring passage axis therethrough, with at least one of said ring passages being aligned with said at least one row of hook retaining holes:
    a belt strap comprising a flexible length of material and having a fixed lower loop and an openable and reclosable upper loop, with said lower loop and said upper loop respectively defining a ring loop axis and a belt loop axis, and said upper loop being securable about a belt;
    a planar ring extending through said lower loop of said belt strap and further extending through said ring passages of said tube, thereby connecting said tube to said belt strap by means of said ring, and;
    said ring passage axis through said tube, said ring loop axis, and said belt loop axis being substantially parallel to one another when said tube is suspended from said ring with said major axis of said tube disposed substantially vertically to define a lure securing position, with a lure externally secured to said carrier by means of the hook tip of the lure being retained within one of said hook retaining holes and having the hook shank disposed adjacent said side wall of said tube and substantially parallel to said major axis of said tube, whereby;
    said tube is raised from said lure securing position to a substantially horizontal position and further twisted about said major axis of said tube to position said row of hook retaining holes facing substantially upward, and a lure is replaceably removed from said carrier by allowing the shank of the hook to gravitationally rotate downward to be disposed substantially perpendicular to said major axis of said tube so that as the hook shank of the lure rotates toward said side wall of said tube as said tube is twisted about said major axis, the hook tip of the lure is rotated from within said hook retaining hole to allow the replaceable removal of the lure from said carrier.

2. The carrier of claim i wherein:
    each of said hook retaining holes has a diameter of one eighth of an inch, whereby:
    fishing lures having hooks of up to 4/0 size are releasably secured to said carrier.

3. The carrier of claim 1 wherein:
    at least said tube is formed of pvc plastic material.

4. The carrier of claim 1 wherein:
    said openable and reclosable upper loop of said belt strap includes cooperating hook and loop fastening material thereon providing for the reclosable opening thereof.

5. The carrier of claim 1 wherein:
    at least said belt strap is formed of Nylon fabric material.

* * * * *